June 26, 1928.
J. C. DAWSON
1,675,299
TEMPORARY BINDER RING AND PROCESS OF MAKING THE SAME
Filed Oct. 6, 1924
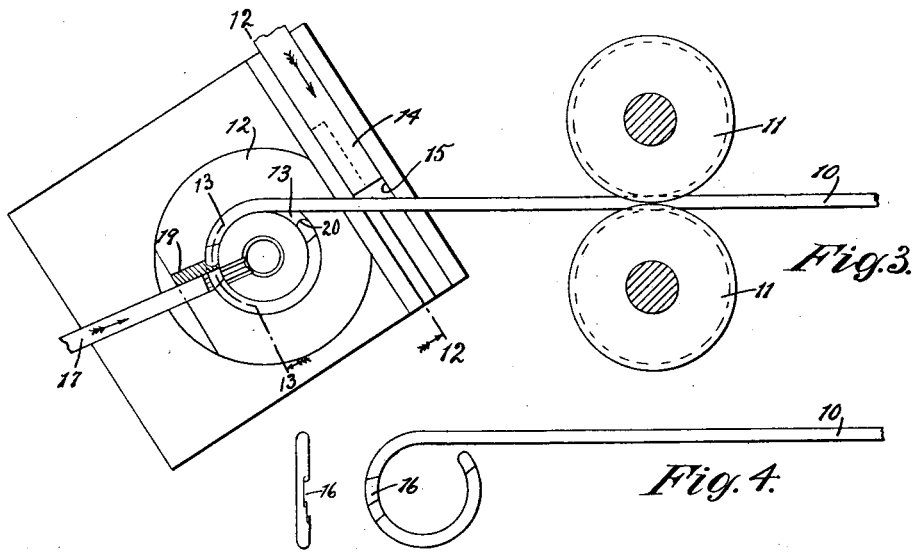
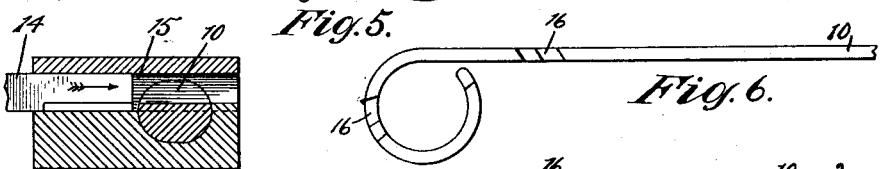
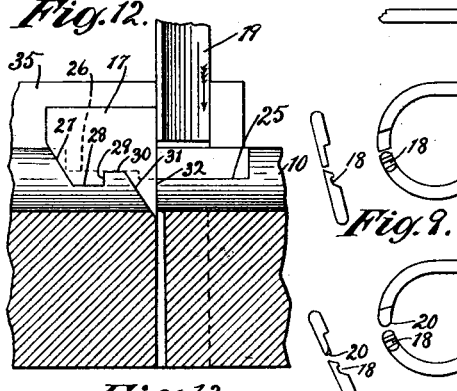
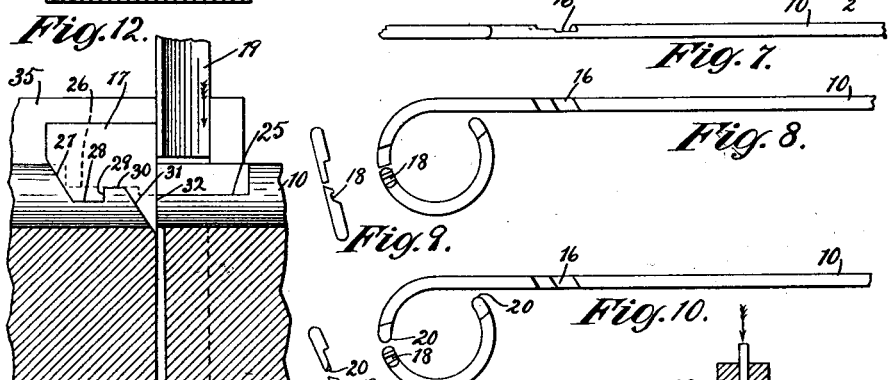
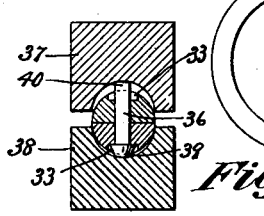
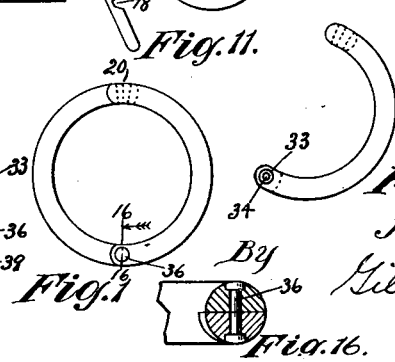
Inventor:
James C. Dawson
By Gillem, Mann & Coe
Atty's.

Patented June 26, 1928.

1,675,299

UNITED STATES PATENT OFFICE.

JAMES C. DAWSON, OF WEBSTER GROVES, MISSOURI, ASSIGNOR TO ELMA N. DAWSON, OF WEBSTER GROVES, MISSOURI.

TEMPORARY BINDER RING AND PROCESS OF MAKING THE SAME.

Application filed October 6, 1924. Serial No. 741,821.

This invention relates to temporary binder rings and has for its principal objects to promote the economical manufacture of rings; to permit ring sections to be made by repeating a series of simple operations on a continuous wire; to permit the hinged portions to be formed by shearing; to permit the interlocking notches to be formed by shearing, and to produce smooth jointed rings with half lap hinge portions.

Further objects and advantages of the invention will become apparent as the disclosure proceeds and the description is read in connection with the accompanying drawings, illustrating a selected embodiment of the invention and in which Fig. 1 is a plan view of a temporary binder ring made according to this invention;

Fig. 2 is a half section of such a ring;

Fig. 3 is a plan view illustrating a machine for repeating a set of operations on a continuous wire to produce ring sections such as shown in Fig. 2;

Figs. 4 and 5 are plan and end elevations of the wire at the inception of a set of operations;

Figs. 6 and 7 are similar views illustrating the wire after the notching operation;

Figs. 8 and 9 are similar views illustrating the wire after it has been severed at the notch and trimmed to form the interlocking notch;

Figs. 10 and 11 are similar views illustrating the wire after the new end has been trimmed;

Fig. 12 is a section on the line 12—12 of Fig. 3;

Fig. 13 is a fragmentary sectional view on the line 13—13 of Fig. 3;

Fig. 14 is a sectional view illustrating the straightening, countersinking and punching dies;

Fig. 15 is a transverse sectional view of riveting dies and a ring in the process of being riveted; and Fig. 16 is a transverse section on the line 16—16 of Fig. 1, showing how the hinge joint conforms to the cross sectional contour of the ring section.

Referring to Fig. 3, 10 indicates a continuous wire fed by the rollers 11, to a bending die 12 having a curved cavity 13 therein for receiving the wire, and giving it the desired curvature.

14 is a reciprocating cutter or shearing tool moving in guides 15 across the path of the wire 10 and serving to cut the stepped notch 16, shown in profile in Figs. 5 and 7. 17 is a second reciprocating cutter or shearing tool traversing the cavity 13 and serving to sever the wire at the stepped notch when it has been advanced into the bending die and trimming the shallower portion of the notch to form the interlocking notch 18. 19 is a third reciprocating cutter or shearing tool for trimming the end of the wire and giving it the rounded contour indicated at 20, Figs. 3, 10 and 14.

21 and 22 are dies which first grip the half lap hinge portions 23 and remove any distortion that may have been produced in the early operations, at the same time countersinking the rivet hole subsequently made by the descent of the punch 24.

Beginning with the parts shown in the positions indicated in Fig. 3, the cutter 14 moves in the direction of the arrow to cut the notch 16 and resumes the position shown in Fig. 3. The rollers 11 feed the wire into the bending die and produce the forms shown in Figs. 4 and 5. The tool 17 advances in the direction of the arrow across the cavity shearing the wire between the ends of the notch 16 and trimming the shallower portion, as shown most clearly in Fig. 13, where the tool is represented as moving toward the observer on the working stroke. The profile of the notch 16 is indicated by the solid line 25 and the dotted line 26 (Fig. 13). The cutting edge of the tool is indicated by the solid lines 27, 28, 29, 30, 31 and 32.

In the meanwhile the tool 14 has cut another notch 16 in the wire and the state of the development is illustrated in Figs. 8 and 9.

The tool 19 descends in the direction of the arrow in Fig. 13, and trims the new end of the wire as indicated at 20. Figs. 10 and 11 illustrate the result at the end of this operation.

The dies 21 and 22 come together gripping the half lap hinge portion 23 lining the face of it with the face of the ring and making the countersinking 33, Figs. 2, 14 and 15, and then the punch 24 descends and makes the rivet opening 34.

The cap 35 (Fig. 13) of the bending die is raised and the ring section, corresponding to that in Fig. 2, is removed in any suitable manner, as, for instance, by jets of compressed air. The rollers then feed the wire forward and the set of operations is repeated.

Two ring sections like that shown in Fig. 2 are assembled on a rivet 36, as in Fig. 15, and placed between riveting dies 37 and 38, each of which has a recess curved lengthwise in conformity with the curvature of the ring and curved transversely in conformity with the cross section of the wire. The head 39 of rivet 36 is preferably frusto conical, as indicated in Fig. 15, and the point 40 is long enough to project beyond the face of the upper ring section. When the dies are brought together the head flows into the lower countersink while the point flows into the upper countersink and both the upper and lower portions of the rivet are shaped in conformity with the contour of the ring sections, as shown in Fig. 16. An approximation of this may be had by using the same bottom die, setting the point of the rivet down and acting upon the head with a flat die or hammer. The hinge joint produced is, therefore, substantially smooth and does not project at any point beyond the contour represented by a cross section of the wire.

Temporary binder rings hinged on an axis transverse to the plane of the ring have heretofore been made in two distinct types. One was characterized by an enlarged hinge joint resulting from a flattening of the ring sections by swaging and like operations used to produce the cooperating faces that were subsequently punched or drilled and riveted together. This type had the advantages flowing from the cheap swaging operation and the fact that the rings were made of duplicate parts, and could therefore be manufactured by quantity production methods. However, the enlarged joint was objectionable and the rings brought the minimum price.

The other type was distinguished by a smooth joint in which one ring section, having spaced hinge lugs, received an intermediate placed hinge lug on the other section. This construction was uniformly produced by a milling operation, either preceded or followed by a drilling operation, and in turn followed by the riveting operation, that, as a general thing swelled the ends of the rivet inside of the spaced hinge lugs and left the contour of the hinge joint in conformity with the cross-section of the ring. The two ring sections being different, required distinct manufacturing operations which added to the production cost already high on account of the milling and drilling operations.

The present invention results in a stronger ring because the semicylindrical hinge lugs contain more metal than the lugs of the milled jointed rings. In addition, the invention permits the manufacture of smooth jointed rings by automatic machinery at a cost comparable to the enlarged joint rings. It makes it possible to supply the higher grade and more desirable product at substantially the cost of the cheaper product.

This is the result of several innovations, including the formation of the interlocking notches and the hinge lugs by shearing operations, the punching and aligning of the hinge lugs at about the time the shearing operations take place; and the countersinking of the hinge lugs and forming the hinge rivet with substantial heads that do not project beyond the general surface of the ring. The preliminary notch, whether stepped or otherwise, makes the severing and interlocking notch-forming operations easier, both on the product and the machine, though, of course, under favorable conditions the preliminary notching might be advantageously omitted. The use of a stepped form for this preliminary or preparatory notch, among other advantages, reduces the interlocking notch-forming to a trimming operation and permits the profile of the notch to be made more uniform and without any appreciable distortion of the metal, and with less strain on the tools.

By placing the tool for making the preparatory notch between the feeding means and the bending die, interference between operating parts is readily avoided and the wire is bent uniformly, although the half-lap hinge lug has, in fact, been formed except for the severing operation. Furthermore, cutting this preparatory notch in a substantially straight wire permits the tool to be set at an advantageous inclination and the shoulders thus formed assume a substantially radial position when the wire is bent.

By making the severing tool move radially with respect to the ring it can the more readily be made to perform the finishing operation on the interlocking notch, and better clearance is afforded for the shearing tool which trims the new end of the wire, or, in other words, shapes the end of the half-lap hinge lug. By forming the interlocking notch on the rear end of the ring section, viewed as the metal proceeds through the operation, ample clearance is afforded between the shearing tools and the straightening, punching and countersinking tools, and these several operations may be given such relation to each other as is most advantageous under the circumstances.

However, the order and particular nature of the operations, as well as the form and motion of the tools, may be varied quite widely. For example, the preparatory notch 16 may be cut without the use of a shearing tool, or the tool may operate through the die, the shallower portion of that notch may be omitted, the countersinking and punching may take place at any point and the trimming may be done as a final operation, if desired. Hence, the specific description and illustration that have been used to make this disclosure full and clear and the statement of advantages that has been made are not intended to limit the scope of the following claims or require an interpretation of them that will permit any substantial part of the invention to be appropriated without infringement.

I claim as my invention—

1. The process of making temporary sectional wire binder rings which includes cutting a notch in the wire at the end of each section of the ring, severing the wire between the ends of each notch, and trimming an end of one of the severed portions to form an interlocking notch.

2. The process of making temporary sectional wire binder rings which includes cutting a stepped notch in a wire at the end of each section of the ring, severing the wire adjacent to the step of the notch, and trimming the shallower part of the notch to form an interlocking notch.

3. The process of making temporary sectional wire binder rings which includes shearing away half sections of the wire at the end of each section of the ring, and severing the wire at the sheared portions.

4. The process of forming an interlocking notch in temporary binder rings which includes shearing a preliminary notch and subsequently shearing along the profile of the interlocking notch.

5. The process of making temporary binder rings which includes cutting a notch in a wire, bending the wire, severing the wire at the notched portion, and trimming the adjacent end of the severed portion to form an interlocking notch.

6. The process of making temporary binder rings which includes cutting a notch in a wire, bending the wire, severing the wire between the ends of the notch, and trimming the adjacent end of the severed portion, and trimming the adjacent end of the wire.

7. The process of making temporary binder rings which includes cutting notches at intervals in a wire, bending the wire between proximate notches to form part of the ring, severing the wire at each notch, and pivoting the ends of the severed portions to form the ring.

8. The process of making temporary binder rings which includes cutting a stepped notch in a wire, bending the wire adjacent to the notch, severing the wire adjacent to the step in the notch, and trimming the thicker portion of the notch to form an interlocking notch.

9. The process of making temporary binder rings which includes trimming the end of the wire, cutting a notch in the wire at a distance from the end, bending the wire at and adjacent to the notch, punching the trimmed end, and severing the wire at the notch.

10. The process of making temporary binder rings which includes cutting a notch in a wire at a point removed from the end, bending the wire at and adjacent to the notch, severing the wire between the ends of the notch, and punching the new end thus formed.

11. The process of making temporary binder rings which includes cutting a notch along the diameter of a wire at a distance from its end corresponding to the length of a half ring section, bending the wire in a plane including the said diameter, severing the wire at the point removed from the rear end of the said notch, subjecting the notched face to straightening pressure, and punching the notched portion transverse to said diameter.

12. A step in the process of making temporary wire binder rings, which includes cutting a notch in the wire, then simultaneously feeding the wire through a curved cavity in a die, and bending the wire including the notched portion.

13. A step in the process of making temporary wire binder rings, which includes cutting stepped notches in the wire at distances from each other and simultaneously feeding and bending the wire including the notched portion.

14. A temporary binder ring including half sections having semi-cylindrical end portions perforated in alinement and countersunk on their outer sides, and a rivet passing through said end portions and having heads lying in the countersunk portions the other ends of the sections being cut away on their sides and having interlocking portions in their cut away sides.

15. A temporary binder ring including half sections having complementary interlocking notches with corresponding ends and half-lap hinge portions at corresponding ends, said half-lap end portions having alined perforations countersunk on their outer sides, and a rivet having heads in the countersunk portion and curved in conformity with the outer surface of said half-lap portions the other ends of the sections being cut away on their sides and having interlocking portions in their cut away sides.

16. The process of making temporary binder rings which includes bending a wire to the ring form, severing the bent portion, and then forming interlocking means at the ends of the severed portions.

17. The process of making temporary binder rings having notched interlocking ends, which includes feeding a continuous wire with a step-by-step motion to a bending means, cutting ring sections from the end portion of the wire, and simultaneously forming the interlocking notch therein.

18. The process of making temporary binder rings having notched interlocking ends, which includes feeding a continuous wire with a step-by-step motion to a bending means, punching the end of the wire, cutting ring sections from the end portion of the wire, and simultaneously forming the interlocking notch therein.

19. The process of making temporary binder rings, which includes cutting a notch in a wire at a distance from the end corresponding to the length of a ring section, bending the wire about an axis normal to the bottom of the notch, and severing the wire at the notched portion.

20. The process of making temporary binder rings, which includes cutting a notch in a wire at a distance from the end corresponding to the length of a ring section, bending the wire about an axis normal to the bottom of the notch, simultaneously severing the wire at the notched portion, and cutting an interlocked notch in one end formed by the severing.

In testimony whereof I affix my signature.

JAMES C. DAWSON.